United States Patent
Wasko et al.

(10) Patent No.: US 11,606,157 B1
(45) Date of Patent: Mar. 14, 2023

(54) TIME SYNCHRONIZATION BASED ON NETWORK TRAFFIC PATTERNS

(71) Applicant: MELLANOX TECHNOLOGIES, LTD., Yokneam (IL)

(72) Inventors: Wojciech Wasko, Mlynek (PL); Dotan David Levi, Kiryat Motzkin (IL); Guy Lederman, Ness Ziona (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/520,674

(22) Filed: Nov. 7, 2021

(51) Int. Cl.
 H04J 3/06 (2006.01)
 H04L 43/06 (2022.01)
 H04L 43/065 (2022.01)
 H04L 43/067 (2022.01)

(52) U.S. Cl.
 CPC .......... *H04J 3/0697* (2013.01); *H04J 3/0667* (2013.01); *H04L 43/065* (2013.01); *H04L 43/067* (2013.01)

(58) Field of Classification Search
 CPC .......... H04J 3/065; H04J 3/0667; H04J 3/067; H04J 3/0697; H04L 43/065; H04L 43/067
 See application file for complete search history.

(56) References Cited

U.S. PATENT DOCUMENTS

| | | | |
|---|---|---|---|
| 7,080,160 B2 * | 7/2006 | Cognet | H04J 3/0644 709/248 |
| 8,243,727 B2 | 8/2012 | Closset et al. | |
| 8,370,675 B2 | 2/2013 | Kagan | |
| 8,446,896 B2 * | 5/2013 | Bedrosian | H04J 3/0667 370/348 |
| 8,576,883 B2 | 11/2013 | Lansdowne | |
| 8,665,724 B2 * | 3/2014 | Stanwood | H04N 21/64784 370/252 |
| 8,719,452 B1 | 5/2014 | Ding et al. | |
| 8,898,317 B1 * | 11/2014 | Armstrong | H04L 65/1069 709/228 |
| 8,976,778 B2 * | 3/2015 | Bedrosian | H04J 3/0667 370/348 |
| 9,031,071 B2 * | 5/2015 | Conner | H04L 47/283 370/392 |

(Continued)

OTHER PUBLICATIONS

IEEE Std 1588™—2008, "IEEE Standard for a Precision Clock Synchronization Protocol for Networked Measurement and Control Systems", IEEE Instrumentation and Measurement Society, pp. 1-289, Jul. 24, 2008.

(Continued)

*Primary Examiner* — Alpus Hsu
(74) *Attorney, Agent, or Firm* — Kligler & Associates Patent Attorneys Ltd

(57) ABSTRACT

A network node includes a port and circuitry. The port is configured for communicating over a packet network. The circuitry is configured to receive, via the port, a sequence of packets from a peer network node, the sequence of packets including (i) a time-protocol packet and (ii) a transmit-side (TX) time-stamp indicative of a time at which the time-protocol packet was transmitted from the peer network node, to assess a receive-side (RX) traffic pattern over one or more of the received packets in the sequence that precede reception of the time-protocol packet, and to calculate an accuracy measure for the TX time-stamp, based on the assessed RX traffic pattern.

25 Claims, 2 Drawing Sheets

(56) References Cited

U.S. PATENT DOCUMENTS

| | | | | |
|---|---|---|---|---|
| 9,077,667 | B2* | 7/2015 | Sridhar | H04L 65/65 |
| 9,204,408 | B2* | 12/2015 | Hirota | H04B 7/155 |
| 9,226,252 | B2* | 12/2015 | Akhlaq | H04W 56/001 |
| 9,723,579 | B2* | 8/2017 | Chihara | H04W 56/0005 |
| 10,320,952 | B2 | 6/2019 | Raveh et al. | |
| 10,433,270 | B1 | 10/2019 | Arab et al. | |
| 10,523,352 | B2* | 12/2019 | Stein | H03M 13/1165 |
| 2017/0374633 | A1* | 12/2017 | Li | H04W 56/001 |
| 2019/0056972 | A1* | 2/2019 | Zhou | G06F 11/30 |
| 2019/0140957 | A1* | 5/2019 | Johansson | H04L 47/127 |

OTHER PUBLICATIONS

IEEE Std 1588™—2002, "IEEE Standard for a Precision Clock Synchronization Protocol for Networked Measurement and Control Systems", IEEE Instrumentation and Measurement Society, pp. 1-154, Nov. 8, 2002.
Levi et al., U.S. Appl. No. 17/246,730, filed May 3, 2021.
U.S. Appl. No. 17/246,730 Office Action dated Aug. 12, 2022.

* cited by examiner

TIME SYNCHRONIZATION BASED ON NETWORK TRAFFIC PATTERNS

STATEMENT REGARDING SPONSORED RESEARCH OR DEVELOPMENT

The project leading to this application has received funding from the European Union's Horizon 2020 research and innovation program under grant agreement No 957403.

FIELD OF THE INVENTION

The present invention relates generally to time synchronization in communication networks, and particularly to methods and systems for estimating the accuracy of time-stamps.

BACKGROUND OF THE INVENTION

In various applications, network nodes transmit, receive and process time-stamps. Time-stamping is used, for example, in time-synchronization protocols that synchronize network nodes to a common time-base. One common example of such a protocol is the Precision Time Protocol (PTP) defined in IEEE standards 1588-2002 and 1588-2008, and later versions thereof.

SUMMARY OF THE INVENTION

An embodiment of the present invention that is described herein provides a network node including a port and circuitry. The port is configured for communicating over a packet network. The circuitry is configured to receive, via the port, a sequence of packets from a peer network node, the sequence of packets including (i) a time-protocol packet and (ii) a transmit-side (TX) time-stamp indicative of a time at which the time-protocol packet was transmitted from the peer network node, to assess a receive-side (RX) traffic pattern over one or more of the received packets in the sequence that precede reception of the time-protocol packet, and to calculate an accuracy measure for the TX time-stamp, based on the assessed RX traffic pattern.

In an embodiment, the circuitry is configured to assess the RX traffic pattern by assessing respective frame sizes for the one or more of the received packets. Additionally or alternatively, the circuitry is configured to assess the RX traffic pattern by assessing one or more inter-packet gaps between successively received packets in the sequence. In a disclosed embodiment, the circuitry is configured to assess the RX traffic pattern by assessing (i) respective frame sizes for the one or more of the received packets, and (ii) one or more inter-packet gaps between successively received packets in the sequence.

In some embodiments, the circuitry is configured to assess the RX traffic pattern by assessing an inter-packet gap that immediately precedes the time-protocol packet. In an example embodiment, the circuitry is configured to compare the inter-packet gap to a threshold, to set the accuracy measure to a first value when the inter-packet gap exceeds the threshold, and to set the accuracy measure to a second value, lower than the first value, when the inter-packet gap does not exceed the threshold.

In a disclosed embodiment, the peer network node is a direct link partner of the network node.

In some embodiments, the circuitry is configured to initiate an action with respect to the time-protocol packet responsively to the accuracy measure. The action may include assigning, based on the accuracy measure, a weight to a time-synchronization adjustment derived from the time-protocol packet. Alternatively, the action may include disregarding the time-protocol packet responsively to finding that the accuracy measure fails to meet a specified level.

In an embodiment, the circuitry is configured to assess the RX traffic pattern over both (i) the one or more of the received packets that precede reception of the time-protocol packet, and (ii) one or more of the received packets that follow reception of the time-protocol packet.

There is additionally provided, in accordance with an embodiment of the present invention, a network node including a port and circuitry. The port is configured for communicating over a packet network. The circuitry is configured to receive, via the port, a sequence of packets from a peer network node, the sequence of packets including (i) a time-protocol packet and (ii) a transmit-side (TX) time-stamp indicative of a time at which the time-protocol packet was transmitted from the peer network node, to assess a receive-side (RX) traffic pattern over one or more of the received packets in the sequence that precede reception of the time-protocol packet TX time-stamp, and to adjust a time synchronization value based on the assessed RX traffic pattern.

There is also provided, in accordance with an embodiment of the present invention, a method including receiving in a network node, over a packet network, a sequence of packets from a peer network node. The sequence of packets includes (i) a time-protocol packet and (ii) a transmit-side (TX) time-stamp indicative of a time at which the time-protocol packet was transmitted from the peer network node. A receive-side (RX) traffic pattern is assessed in the network node over one or more of the received packets in the sequence that precede reception of the time-protocol packet. An accuracy measure is calculated for the TX time-stamp based on the assessed RX traffic pattern.

There is further provided, in accordance with an embodiment of the present invention, a method including receiving in a network node, over a packet network, a sequence of packets from a peer network node. The sequence of packets includes (i) a time-protocol packet and (ii) a transmit-side (TX) time-stamp indicative of a time at which the time-protocol packet was transmitted from the peer network node. A receive-side (RX) traffic pattern is assessed in the network node over one or more of the received packets in the sequence that precede reception of the time-protocol packet. a time synchronization value is adjusted based on the assessed RX traffic pattern.

The present invention will be more fully understood from the following detailed description of the embodiments thereof, taken together with the drawings in which:

DETAILED DESCRIPTION OF EMBODIMENTS

Overview

Figure 1:
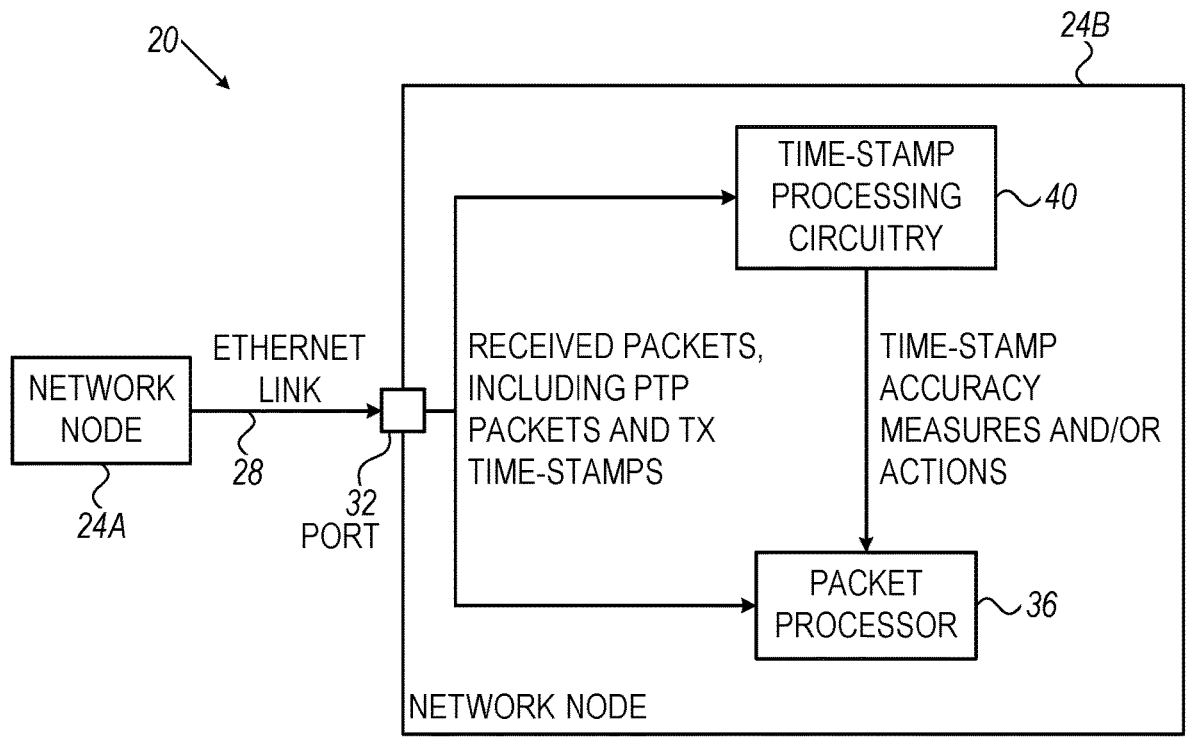
FIG. 1 is a block diagram that schematically illustrates an Ethernet communication system, in accordance with an embodiment of the present invention.

In some network synchronization protocols, PTP being one example, link partners (i.e., network nodes that communicate over a direct network link) synchronize their clocks by exchanging time-protocol packets and respective time-stamps. In the description that follows, the link partners are referred to as a transmitting node ("TX node") and a receiving node ("RX node") for clarity. In a typical synchronization process, the TX node transmits to the RX node (i) a time-protocol packet and (ii) a transmit-side (TX) time-stamp that is indicative of the time at which the time-protocol packet was transmitted, according to the TX node's clock. The TX time-stamp may be transmitted as part of the time-protocol packet or separately. The RX node synchronizes its clock to the TX node's clock using the time-protocol packet and the corresponding TX time-stamp.

In practice, the accuracy level of the TX time-stamp may vary depending on various factors. In the present context, the term "time-stamp accuracy level" refers to the accuracy with which the time value encoded in the TX time-stamp represents the actual time (according to the TX node's clock) at which the TX time-stamp departed the TX node. Time-stamp accuracy is also referred to herein as time-stamp confidence level. Certain aspects relating to time-stamp accuracy are addressed in U.S. patent application Ser. No. 17/246,730, entitled "Timestamp Confidence level," filed May 3, 2021, which is assigned to the assignee of the present patent application and whose disclosure is incorporated herein by reference.

One major factor that affects the TX time-stamp accuracy is the instantaneous traffic pattern at the TX node, and the associated state information (e.g., egress queue occupancy). For example, when the TX node is relatively idle, TX time-stamps are likely to be highly accurate. In contrast, when the TX node is busy processing a large amount of outgoing traffic, the accuracy of TX time-stamps may be degraded. The accuracy of TX time-stamps is important for the RX node, which may take this information into account in the synchronization process. Typically, however, the RX node has no visibility as to the traffic pattern at the TX node.

Embodiments of the present invention that are described herein provide techniques for estimating the accuracy level of a received TX time-stamp. The disclosed techniques use the fact that the receive-side (RX) traffic pattern at the RX node is extremely similar (and typically identical) to the transmit-side (TX) traffic pattern at the TX node. This similarity holds especially for link partners, since they communicate via a direct network link, but in some cases may also hold for a TX node and an RX node that are not direct link partners.

In some embodiments described herein, the RX node receives a sequence of packets from the TX node (also referred to as a "peer network node" of the RX node). The sequence comprises, inter alia, (i) a time-protocol packet and (ii) a TX time-stamp indicative of the time at which the time-protocol packet was transmitted from the TX node. The RX node assesses the RX traffic pattern over one or more of the received packets in the sequence that precede reception of the time-protocol packet. The RX node then calculates an accuracy measure for the TX time-stamp based on the assessed RX traffic pattern.

In various embodiments, the RX node may define and assess the RX traffic pattern in various ways. Typically, the traffic pattern is defined in terms of frame sizes of one or more of the received packets, and/or one or more inter-packet gaps (IPGs) between successively received packets. The number of received packets being considered in assessing the RX traffic pattern may be configurable.

In one example embodiment, the RX node examines the IPG that immediately precedes the time-protocol packet. The RX node compares this IPG to a defined threshold, e.g., to $k \cdot IPG_{min}$, for some minimal IPG denoted $IPG_{min}$ and a constant k. If the IPG exceeds the threshold, the RX node assigns the TX time-stamp a high accuracy measure. If the IPG does not exceed the threshold, the RX node assigns the TX time-stamp a lower accuracy measure. This accuracy measure is computationally-simple yet effective.

In some embodiments, the RX node may take various actions with respect to the time-protocol packet, depending on the accuracy measure calculated for the time-protocol packet. For example, the RX node may assign, based on the accuracy measure, a weight to a time-synchronization adjustment derived from the time-protocol packet. As another example, the RX node may disregard a time-protocol packet if the accuracy measure of the corresponding TX time-stamp fails to meet a specified level.

The techniques described herein improve the performance of time-synchronization processes in the RX node, by considering the varying accuracy levels of received TX time-stamps. Moreover, the disclosed techniques are typically passive and self-contained within the RX node. In other words, the TX node may be a conventional network node, or otherwise be unaware of the accuracy estimation being carried out in the RX node.

System Description

FIG. 1 is a block diagram that schematically illustrates an Ethernet communication system 20, in accordance with an embodiment of the present invention. System 20 comprises two network nodes 24A and 24B, which communicate with one another over an Ethernet link 28. Each of the network nodes may comprise, for example, a network adapter (e.g., Network Interface Controller—NIC) of a compute node, or a network switch. System 20 typically comprises a large number of network nodes, including nodes 24A and 24B, and link 28 is typically part of a larger packet network. The figure focuses on the two network nodes in question for the sake of clarity.

System 20 uses a suitable time-synchronization protocol for synchronizing the clocks of the various network nodes. The embodiments described herein refer mainly to PTP, by way of example. The disclosed techniques, however, are applicable to other suitable time-synchronization protocols, such as, for example, the Network Time Protocol (NTP).

In the present example, nodes 24A and 24B are link partners. For purposes of time synchronization, node 24A plays the role of a TX node (which transmits time-protocol packets and corresponding TX time-stamps), and node 24B plays the role of an RX node (which synchronizes its clock to the TX node based on received time-protocol packets and corresponding TX time-stamps). In the context of PTP, TX node 24A serves as a PTP master, and RX node 24B serves as a PTP slave.

In the embodiment of FIG. 1, RX node 24B comprises a port 32 for transmitting and receiving packets to and from link 28, and a packet processor 36 that processes the received and transmitted packets. RX node 24B further comprises time-stamp processing circuitry 40 that carries out the techniques described herein. Additional elements of node 24B, which are not necessary for understanding of the disclosed techniques, have been omitted from the figure for the sake of clarity. For example, packet transmission in the opposite direction, from node 24B to node 24A, is not addressed in the figure since it is unrelated the disclosed techniques.

During operation of system 20, RX node 24B receives packets from TX node 24A over link 28. The received packets may comprise various types of packets, including time-protocol packets (PTP packets in the present example). Each PTP packet is accompanied by a respective TX time-stamp, which may be embedded in the PTP packet itself or in a different packet. Time-stamp processing circuitry 40 calculates a respective accuracy measure for each time-stamp, using methods that are explained below. In some embodiments, time-stamp processing circuitry 40 also initiates suitable actions in response to the accuracy measures. In other embodiments, time-stamp processing circuitry 40 reports the time-stamp accuracy measures to packet processor 36, and the appropriate actions are initiated by the packet processor.

The configurations of system 20 and node 24B, as shown in FIG. 1, are example configurations that are depicted purely for the sake of conceptual clarity. Any other suitable configurations can be used in alternative embodiments. The various system and network-node elements described herein may be implemented using software, using suitable hardware such as in one or more Application-Specific Integrated Circuits (ASIC) or Field-Programmable Gate Arrays (FPGA), or using a combination of software and hardware elements.

Certain elements of network node 24B may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Time-Stamp Accuracy Estimation Based on Receive-Side Traffic Pattern

As explained above, the instantaneous traffic pattern at TX node 24A has a major impact on the accuracy levels of the TX time-stamps. In some embodiments, RX node 24B assesses the accuracy of received TX time-stamps based on the RX traffic pattern, which is (i) highly correlative to the TX traffic pattern and (ii) available locally at RX node 24B.

Figure 2:
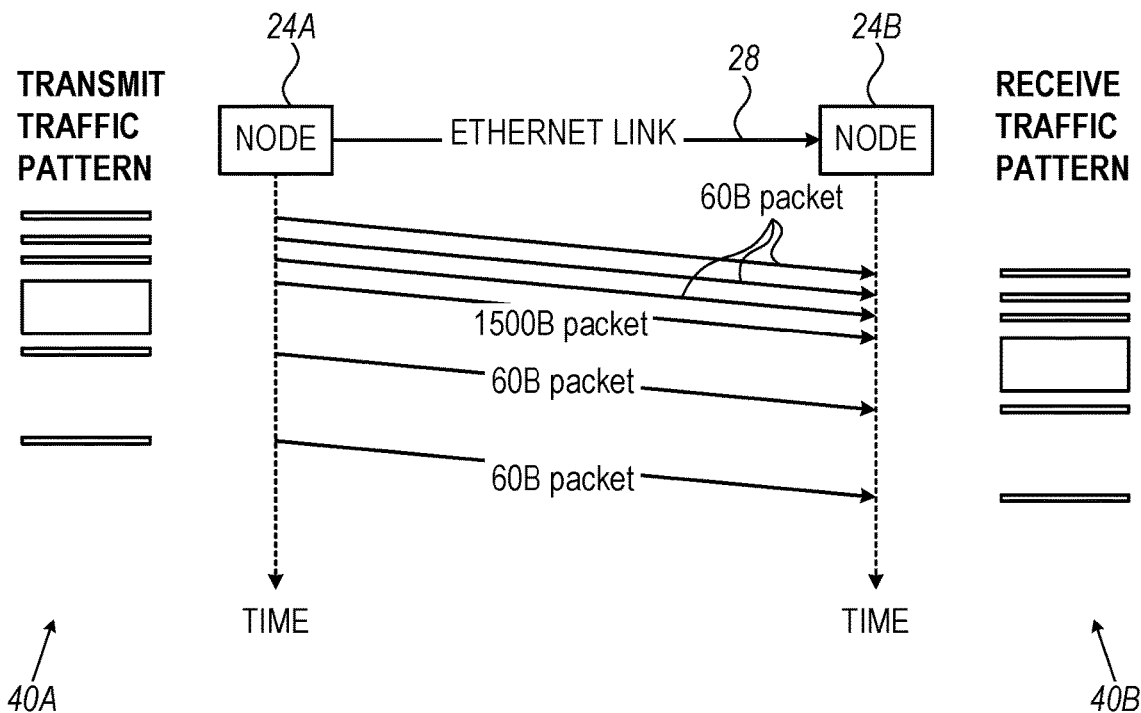
FIG. 2 is a diagram that schematically illustrates transmit-side (TX) and receive-side (RX) traffic patterns in the system of FIG. 1, in accordance with an embodiment of the present invention.

FIG. 2 is a diagram that schematically illustrates TX and RX traffic patterns in system 20 of FIG. 1, in accordance with an embodiment of the present invention. An example TX traffic pattern 40A is shown on the left-hand side of the figure, as a function of time. In this example, over a certain time interval, TX node 24A transmits three 60-byte packets closely spaced in time, followed closely by a 1500-byte packet and then another 60-byte packet. Then comes a longer gap, after which the TX node transmits another 60-byte packet. The time gaps between successive packets in the sequence are referred to as Inter-Packet Gaps (IPGs). In the present example, the traffic pattern is defined by the series of frame sizes and IPGs.

A corresponding RX traffic pattern 40B is shown on the right-hand side of the figure. As seen, RX traffic pattern 40B is substantially identical to TX traffic pattern 40A (in the present example both traffic patterns comprise substantially the same series of frame sizes and IPGs). As such, RX node 24B can use RX traffic pattern 40B as an accurate approximation of TX traffic pattern 40A, e.g., for the purpose of estimating TX time-stamp accuracy.

Figure 3:
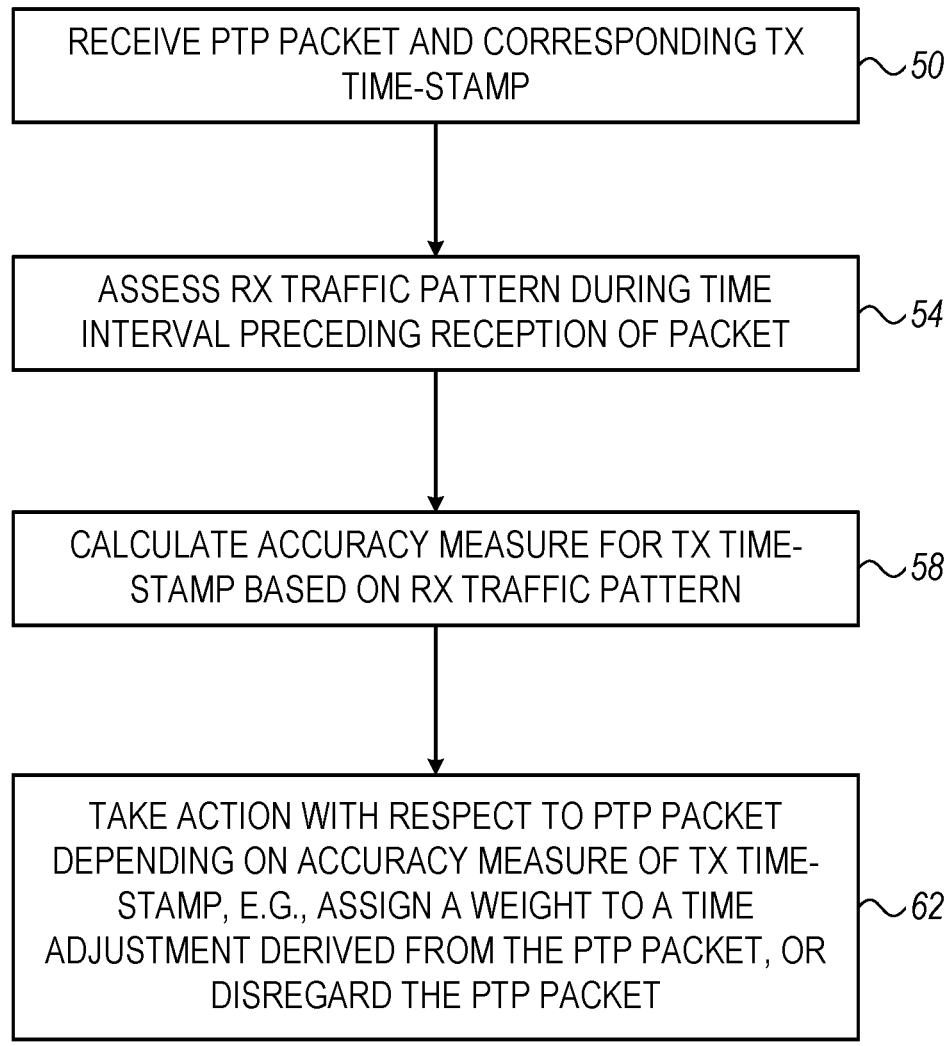
FIG. 3 is a flow chart that schematically illustrates a method for time-stamp accuracy estimation, in accordance with an embodiment of the present invention.

FIG. 3 is a flow chart that schematically illustrates a method for time-stamp accuracy estimation, in accordance with an embodiment of the present invention. The method begins with RX node 24B receiving a sequence of packets from TX node 24A, at a reception stage 50. The sequence includes a PTP packet and a corresponding TX time-stamp, either in the same packet or separately. The packets are received through port 32 and delivered to time-stamp processing circuitry 40 and to packet processor 36.

At a traffic pattern assessment stage 54, time-stamp processing circuitry 40 assesses the RX traffic pattern over one or more packets that precede the reception of the PTP packet.

In various embodiments, time-stamp processing circuitry 40 may assess the RX traffic pattern in various ways. For example, time-stamp processing circuitry 40 may record one or more frame sizes and/or one or more IPGs for the packets that precede the reception of the PTP packet. The number of frame sizes and the number of IPGs may be configurable or fixed. The traffic pattern may be defined by one or more frame sizes and one or more IPGs, one or more frame sizes only (i.e., regardless of IPGs), or one or more IPGs only (i.e., regardless of frame sizes).

In some embodiments, the RX traffic pattern consists of a single IPG—the IPG that immediately precedes the PTP packet. This simple RX traffic pattern is highly effective, because the most-recent IPG has a major impact on the load and occupancy of TX node 24A while processing the PTP packet.

The RX traffic patterns listed above are example patterns, which are chosen purely for the sake of clarity. In alternative embodiments, the RX traffic pattern can be defined and assessed in any other suitable way.

At an accuracy calculation stage 58, time-stamp processing circuitry 40 calculates an accuracy measure for the TX time-stamp based on the assessed RX traffic pattern. In an example embodiment, the RX traffic pattern is defined as the most-recent IPG (the IPG that precedes the PTP packet), and circuitry 40 calculates the accuracy measure by comparing the most-recent IPG to a defined threshold. The threshold may comprise, for example, k $IPG_{min}$, for some minimal IPG denoted $IPG_{min}$ and a constant k. If the most-recent IPG exceeds the threshold, circuitry 40 assigns the TX time-stamp a high accuracy measure. If the most-recent IPG does not exceed the threshold, circuitry 40 assigns the TX time-stamp a lower accuracy measure.

Alternatively, circuitry 40 may calculate the time-stamp accuracy measures in any other suitable way based on the RX traffic pattern.

At an action initiation stage 62, time-stamp processing circuitry 40 may initiate an action with respect to the PTP packet, depending on the accuracy measure of the corresponding TX time-stamp. (For clarity, the description herein assumes that the action is taken by time-stamp processing circuitry 40. Generally, however, the action may be taken by any other suitable element of RX node 24B, e.g., by packet processor 36.)

In one example, time-stamp processing circuitry 40 derives a time-synchronization adjustment (to be applied to the clock of RX node 24B) from the PTP packet. In an embodiment, time-stamp processing circuitry 40 scales the time-synchronization adjustment by a weight that depends on the time-stamp accuracy measure. In this manner, PTP packets having highly-accurate TX time-stamps will have a higher weight in the time-synchronization adjustments, in comparison with PTP packets having lower-accuracy TX time-stamps.

In another example, time-stamp processing circuitry 40 may disregard a certain PTP packet (or otherwise prevent the PTP packet from being considered in time synchronization) if the accuracy measure of the corresponding TX time-stamp fails to meet a specified level.

Further alternatively, RX node 24B may initiate or take any other suitable action, with respect to the PTP packet, depending on the accuracy measure of the corresponding TX time-stamp.

The method of FIG. 3 is an embodiment that is depicted purely by way of example. In alternative embodiments, any other suitable method can be used. For example, the RX traffic pattern may be assessed in hardware and provided to a higher layer, e.g., a software layer, for further processing. In one example embodiment, a NIC in the RX node assesses the RX traffic pattern, and delivers the RX traffic pattern to a driver, library or application for further processing.

As another example, time-stamp processing circuit 40 may use multiple different rules for deriving accuracy measures from received TX time-stamps. The rules may differ, for example, from one transmission speed to another, from one Forward Error Correction (FEC) code to another, and the like.

As yet another example, in some embodiments, time-stamp processing circuit 40 may include in the RX traffic pattern one or more packets that follow the PTP packet (in addition to one or more packets that precede the PTP packet).

Although the embodiments described herein mainly address the use of traffic patterns in estimating time-stamp accuracy, the methods and systems described herein can also be used in other applications, such as in congestion control based on traffic pattern assessment.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network node, comprising:
a port for communicating over a packet network; and
circuitry, configured to:
receive, via the port, a sequence of packets from a peer network node, the sequence comprising (i) a time-protocol packet of a time-synchronization protocol employed in the packet network and (ii) a transmit-side (TX) time-stamp which is included in the time-protocol packet or in a separate packet, the TX time-stamp being indicative of a time at which the time-protocol packet was transmitted from the peer network node;
assess a receive-side (RX) traffic pattern based on one or more of the received packets in the sequence that precede reception of the time-protocol packet; and
calculate an accuracy measure for the TX time-stamp, based on the assessed RX traffic pattern.

2. The network node according to claim 1, wherein the circuitry is configured to assess the RX traffic pattern by assessing respective frame sizes for the one or more of the received packets.

3. The network node according to claim 1, wherein the circuitry is configured to assess the RX traffic pattern by assessing one or more inter-packet gaps between successively received packets in the sequence.

4. The network node according to claim 1, wherein the circuitry is configured to assess the RX traffic pattern by assessing (i) respective frame sizes for the one or more of the received packets, and (ii) one or more inter-packet gaps between successively received packets in the sequence.

5. The network node according to claim 1, wherein the circuitry is configured to assess the RX traffic pattern by assessing an inter-packet gap that immediately precedes the time-protocol packet.

6. The network node according to claim 5, wherein the circuitry is configured to compare the inter-packet gap to a threshold, to set the accuracy measure to a first value when the inter-packet gap exceeds the threshold, and to set the accuracy measure to a second value, lower than the first value, when the inter-packet gap does not exceed the threshold.

7. The network node according to claim 1, wherein the peer network node is a direct link partner of the network node.

8. The network node according to claim 1, wherein the circuitry is configured to initiate an action with respect to the time-protocol packet responsively to the accuracy measure.

9. The network node according to claim 8, wherein the action comprises assigning, based on the accuracy measure, a weight to a time-synchronization adjustment derived from the time-protocol packet.

10. The network node according to claim 8, wherein the action comprises disregarding the time-protocol packet responsively to finding that the accuracy measure fails to meet a specified level.

11. The network node according to claim 1, wherein the circuitry is configured to assess the RX traffic pattern over both (i) the one or more of the received packets that precede reception of the time-protocol packet, and (ii) one or more of the received packets that follow reception of the time-protocol packet.

12. A network node, comprising:
a port for communicating over a packet network; and
circuitry, configured to:
receive, via the port, a sequence of packets from a peer network node, the sequence comprising (i) a time-protocol packet of a time-synchronization protocol employed in the packet network and (ii) a transmit-side (TX) time-stamp which is included in the time-protocol packet or in a separate packet, the TX time-stamp being indicative of a time at which the time-protocol packet was transmitted from the peer network node;
assess a receive-side (RX) traffic pattern based on one or more of the received packets in the sequence that precede reception of the time-protocol packet TX time-stamp; and
based on the assessed RX traffic pattern, perform one of (i) assigning a weight to a time-synchronization adjustment derived from the time-protocol packet and (ii) disregarding the time-protocol packet.

13. A method, comprising:
receiving in a network node, over a packet network, a sequence of packets from a peer network node, the sequence comprising (i) a time-protocol packet of a time-synchronization protocol employed in the packet network and (ii) a transmit-side (TX) time-stamp which is included in the time-protocol packet or in a separate packet, the TX time-stamp being indicative of a time at which the time-protocol packet was transmitted from the peer network node;
assessing in the network node a receive-side (RX) traffic pattern based on one or more of the received packets in the sequence that precede reception of the time-protocol packet; and
calculating an accuracy measure for the TX time-stamp, based on the assessed RX traffic pattern.

14. The method according to claim 13, wherein assessing the RX traffic pattern comprises assessing respective frame sizes for the one or more of the received packets.

15. The method according to claim 13, wherein assessing the RX traffic pattern comprises assessing one or more inter-packet gaps between successively received packets in the sequence.

16. The method according to claim 13, wherein assessing the RX traffic pattern comprises assessing (i) respective frame sizes for the one or more of the received packets, and (ii) one or more inter-packet gaps between successively received packets in the sequence.

17. The method according to claim 13, wherein assessing the RX traffic pattern comprises assessing an inter-packet gap that immediately precedes the time-protocol packet.

18. The method according to claim 17, wherein calculating the accuracy measure comprises comparing the inter-packet gap to a threshold, setting the accuracy measure to a first value when the inter-packet gap exceeds the threshold, and setting the accuracy measure to a second value, lower than the first value, when the inter-packet gap does not exceed the threshold.

19. The method according to claim 13, wherein the peer network node is a direct link partner of the network node.

20. The method according to claim 13, and comprising initiating an action with respect to the time-protocol packet responsively to the accuracy measure.

21. The method according to claim 20, wherein initiating the action comprises assigning, based on the accuracy measure, a weight to a time-synchronization adjustment derived from the time-protocol packet.

22. The method according to claim 20, wherein initiating the action comprises disregarding the time-protocol packet responsively to finding that the accuracy measure fails to meet a specified level.

23. The method according to claim 13, wherein assessing the RX traffic pattern is performed over both (i) the one or more of the received packets that precede reception of the time-protocol packet, and (ii) one or more of the received packets that follow reception of the time-protocol packet.

24. A method, comprising:
receiving in a network node, over a packet network, a sequence of packets from a peer network node, the sequence comprising (i) a time-protocol packet of a time-synchronization protocol employed in the packet network and (ii) a transmit-side (TX) time-stamp which is included in the time-protocol packet or in a separate packet, the TX time-stamp being indicative of a time at which the time-protocol packet was transmitted from the peer network node;
assessing in the network node a receive-side (RX) traffic pattern based on one or more of the received packets in the sequence that precede reception of the time-protocol packet; and
based on the assessed RX traffic pattern, performing one of (i) assigning a weight to a time-synchronization adjustment derived from the time-protocol packet and (ii) disregarding the time-protocol packet.

25. A network node, comprising:
a port for communicating over a packet network; and
circuitry, configured to:
receive, via the port, a sequence of packets from a peer network node, the sequence comprising (i) a time-protocol packet of a time-synchronization protocol employed in the packet network and (ii) a transmit-side (TX) time-stamp which is included in the time-protocol packet or in a separate packet, the TX time-stamp being indicative of a time at which the time-protocol packet was transmitted from the peer network node;
assess a receive-side (RX) traffic pattern based on one or more of the received packets in the sequence that precede reception of the time-protocol packet; and
based on the assessed RX traffic pattern, process one or both of the time-protocol packet and the TX time-stamp.

\* \* \* \* \*